United States Patent
Bellows et al.

(10) Patent No.: US 7,669,028 B2
(45) Date of Patent: Feb. 23, 2010

(54) OPTIMIZING DATA BANDWIDTH ACROSS A VARIABLE ASYNCHRONOUS CLOCK DOMAIN

(75) Inventors: Mark D. Bellows, Rochester, MN (US); Brian M. McKevett, Rochester, MN (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 11/348,884

(22) Filed: Feb. 7, 2006

(65) Prior Publication Data

US 2007/0186071 A1 Aug. 9, 2007

(51) Int. Cl.
G06F 12/00 (2006.01)
G06F 13/00 (2006.01)
G06F 13/28 (2006.01)
(52) U.S. Cl. .......................... 711/167; 711/154; 710/56
(58) Field of Classification Search .................. 711/167
See application file for complete search history.

(56) References Cited

U.S. PATENT DOCUMENTS 6,952,739 B2 * 10/2005 Fritz et al. .................. 709/232
7,003,616 B2 * 2/2006 Shimura ...................... 710/313
7,093,047 B2 * 8/2006 Au et al. ...................... 710/243
7,110,831 B2 * 9/2006 Shimura ........................ 700/5
7,467,277 B2 * 12/2008 Barnum et al. .............. 711/167
2003/0014564 A1 * 1/2003 Isoda et al. ..................... 710/1
2004/0267982 A1 * 12/2004 Jackson et al. ................ 710/52
2008/0307184 A1 * 12/2008 Barnum et al. .............. 711/167

* cited by examiner

Primary Examiner—Brian R Peugh
Assistant Examiner—Prasith Thammavong
(74) Attorney, Agent, or Firm—Patterson & Sheridan, LLP

(57) ABSTRACT

Embodiments of the present invention optimize data bandwidth across an asynchronous buffer in a system with a variable clock domain. A move signal may be asserted to transfer data associated with a command into the asynchronous buffer. After the data has been moved into the buffer, an acknowledge signal may indicate that the transfer is complete. A launch signal may transfer the data in the asynchronous buffer to memory. Embodiments of the present invention allow the processing of a next command to begin at the earliest possible time while data associated with a previous command is being transferred into and out of the buffer, thereby increasing throughput and improving performance.

20 Claims, 5 Drawing Sheets

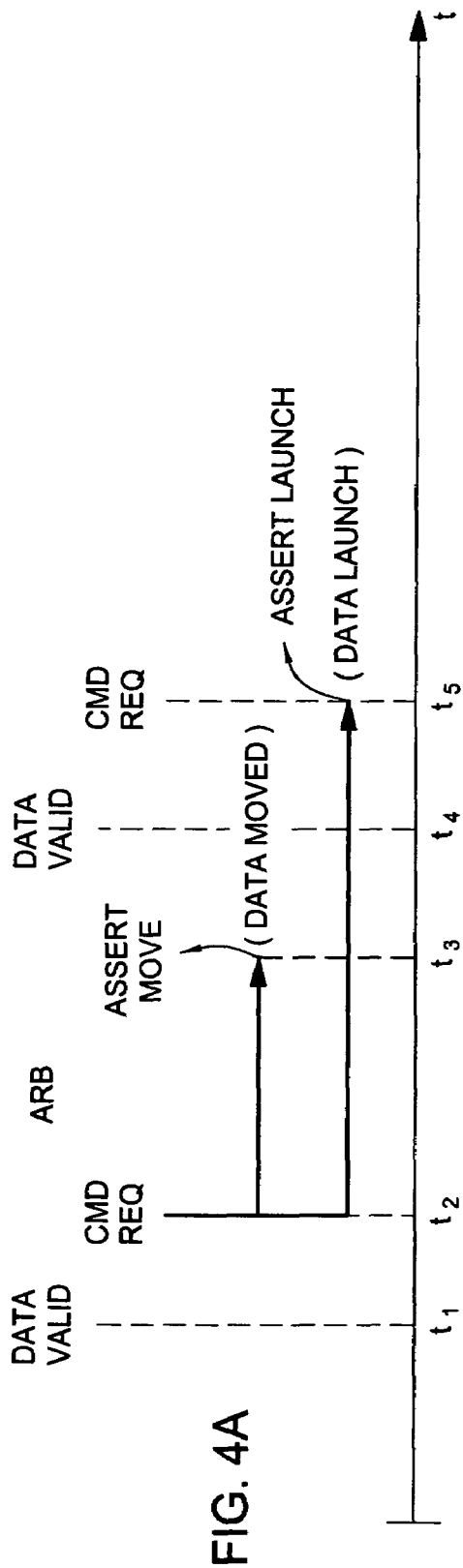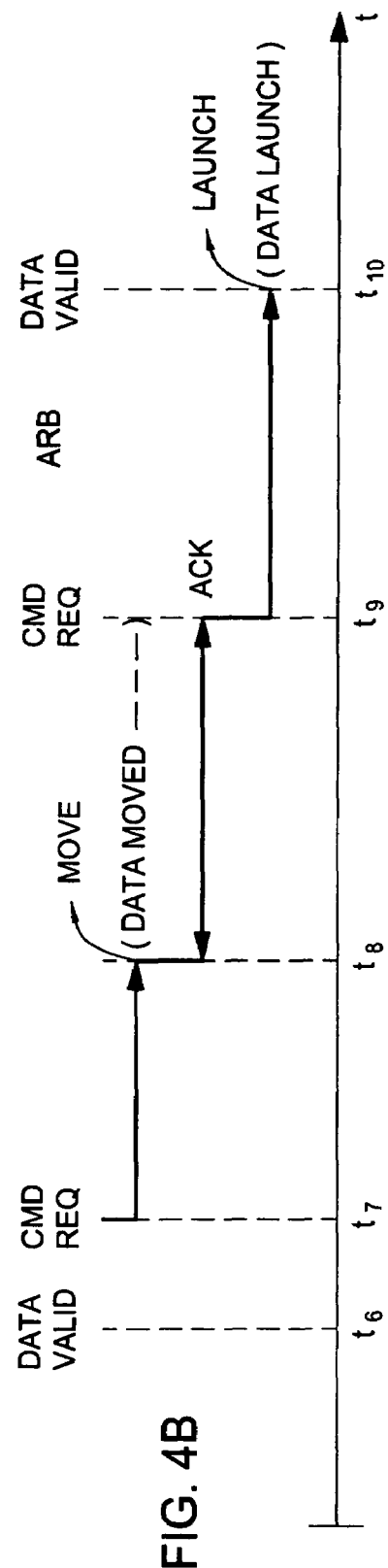

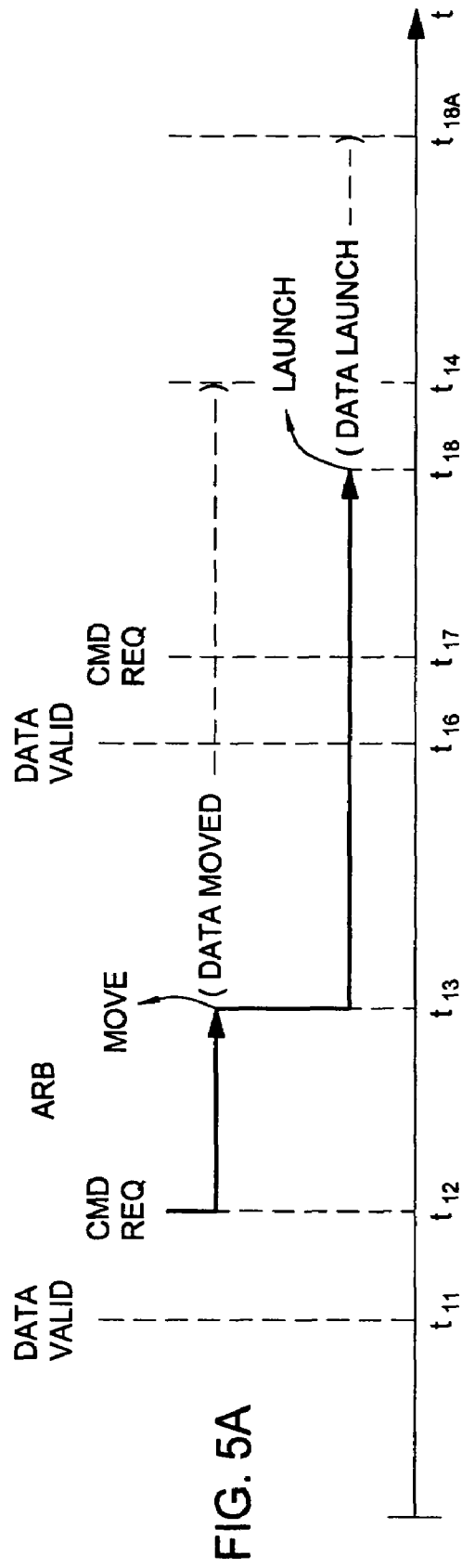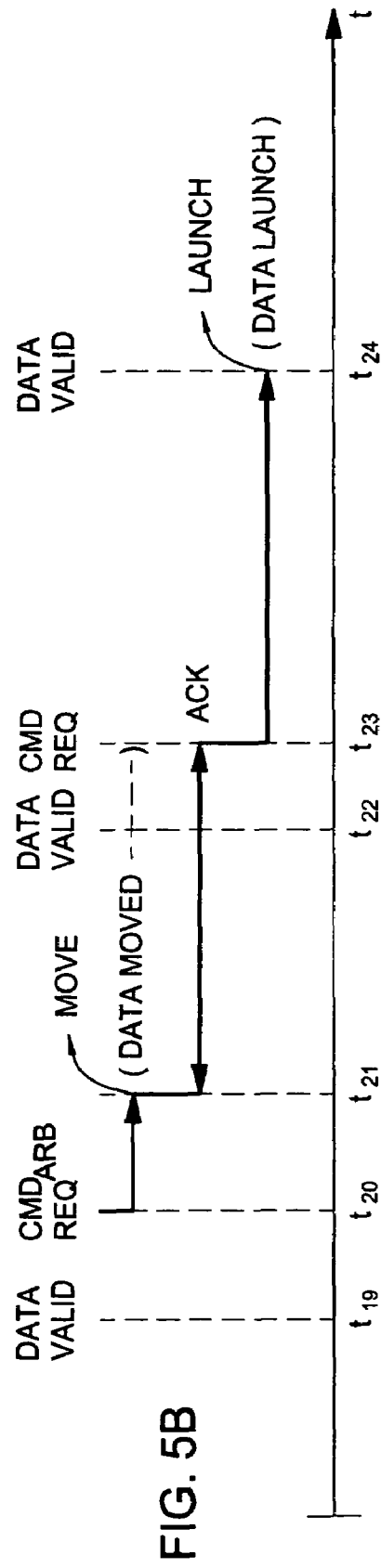
FIG. 5A
FIG. 5B

OPTIMIZING DATA BANDWIDTH ACROSS A VARIABLE ASYNCHRONOUS CLOCK DOMAIN

CROSS-REFERENCE TO RELATED APPLICATIONS

This application is related to U.S. patent application Ser. No. 11/348,879, (now U.S. Pat. No. 7,467,277), entitled A MEMORY CONTROLLER OPERATING IN A SYSTEM WITH A VARIABLE SYSTEM CLOCK, filed Feb. 7, 2006, by Mark D. Bellows et al. This related patent application is herein incorporated by reference in its entirety.

BACKGROUND OF THE INVENTION

1. Field of the Invention

The present invention generally relates to memory controllers. More specifically, the invention relates to optimizing data bandwidth across an asynchronous buffer in a system with a variable clock domain.

2. Description of the Related Art

A system on a chip (SOC) generally includes one or more integrated processor cores, some type of embedded memory, such as a cache shared between the processor cores, and peripheral interfaces, such as memory control components and external bus interfaces, on a single chip to form a complete (or nearly complete) system. The external bus interface is often used to pass data in packets over an external bus between the SOC and an external device, such as an external memory controller.

The increasing demand for higher processor performance has lead to dramatic increases in clock frequencies of processor cores. As the chips become faster and larger, improving performance while containing power dissipation has become a significant challenge. One solution to conserve power may be to implement multiple clock domains in the processor. A Multiple Clock Domain (MCD) processor may comprise one or more clock domains that run at different frequencies. Moreover, the voltage and frequency for each domain may be independently and dynamically controlled, thereby allowing the selection of frequencies and voltages that conserve energy and maximize performance.

One challenge in implementing such a solution is that memory interfaces typically require a constant frequency. Therefore, the memory controller must be able to accommodate frequency changes in the processor core. For example, the memory controller may contain large command queues to receive read and write commands from the processor in the processor clock domain. The memory controller may also contain memory interface sequencers in the memory clock domain. The memory interface sequencers, for example, may be configured to perform memory accesses such as read and write accesses at a constant frequency in the memory clock domain.

The memory controller may also contain asynchronous read and write buffers configured to exchange data between the different clock domains. For example an asynchronous read buffer may be configured to receive read data from memory in the memory clock domain and send the read data to the processor in the processor clock domain. Similarly, an asynchronous write buffer may receive write data from the processor in the processor clock domain and send the write data to memory in the memory clock domain.

One problem with this solution is that if the frequency of the processor core changes, the buffers may overflow in some instances and under run in other instances. For example, if the processor frequency is reduced with respect to the memory frequency to conserve power, read data from memory may be received in the read buffer at a rate greater than the rate at which the data is read by the processor from the buffer. Therefore, the read buffer may overflow.

On the other hand, with respect to the write buffers, if the processor frequency is slowed relative to the memory frequency, a write buffer under run may occur. For example, write data in the write buffers may be transferred to memory based on assumptions regarding the availability of data in the write buffer. The assumptions, for example, may include the timing for transfer of data from the processor to the write buffer. If the processor frequency is reduced, write data may be transferred to the write buffers at a slower rate, thereby invalidating previous assumptions. In other words, data may not be written fast enough to satisfy timing requirements of the memory device.

One solution to prevent write buffer under runs may be to wait for write data to be completely transferred into the write buffer before the data is transferred out of the write buffer. However, such waiting may introduce significant latencies that may adversely affect performance.

Therefore, what is needed are methods and systems for efficiently transferring data across an asynchronous buffer after a change in processor frequency.

SUMMARY OF THE INVENTION

The present invention generally relates to optimizing data bandwidth across an asynchronous buffer in a system with a variable clock domain.

One embodiment of the invention describes a memory controller. The memory controller generally comprises (i) an asynchronous buffer configured to receive data at a first clock frequency and send data at a second clock frequency, (ii) command control logic configured to select, for processing, a command from one or more lists of commands in response to receiving a data request signal, and issue a valid signal indicating a command is available for processing, and (iii) data flow controller configured to request a command from the command control logic, initiate transfer of data associated with a command into the asynchronous buffer in response to receiving the valid signal by asserting a move signal, receive an acknowledge indicating that the data has been transferred into the asynchronous buffer, assert a launch signal to transfer the data out of the asynchronous buffer, and to request data for a next command, assert the data request signal in a time period, beginning at the assertion of the data valid signal for the command, that is shorter than a first time period, wherein the first time period is the sum of the time period required to assert the move signal and the time period to acknowledge that the data has been moved.

Another embodiment of the invention provides a method for transferring data across an asynchronous buffer. The method generally comprises, for a first command, asserting a move signal, wherein the move signal initiates the transfer of data associated with the first command into the asynchronous buffer at a first clock frequency, asserting a launch signal, wherein the launch signal initiates the transfer of the data associated with the first command out of the asynchronous buffer at a second clock frequency, and requesting data for a second command in a time period, beginning at the assertion of the data valid signal for the first command, that is shorter than a first time period, wherein the first time period is the sum of the time period required to assert the move signal and the time to acknowledge that the data has been moved.

Yet another embodiment of the invention provides a system comprising memory driven by a constant memory clock, a processor driven by a variable processor clock, configured to issue read and write commands to the memory, a clock controller configured to issue a request for changing the frequency of the processor clock, and change the frequency of the processor clock, and a memory controller. The memory controller generally comprises (i) an asynchronous buffer configured to receive data at a first clock frequency and send data at a second clock frequency, (ii) command control logic configured to select, for processing, a command from one or more lists of commands in response to receiving a data request signal, and issue a valid signal indicating a command is available for processing, and (iii) data flow controller configured to request a command from the command control logic, initiate transfer of data associated with a command into the asynchronous buffer in response to receiving the valid signal by asserting a move signal, receive an acknowledge indicating that the data has been transferred into the asynchronous buffer, assert a launch signal to transfer the data out of the asynchronous buffer, and to request data for a next command, assert the data request signal in a time period, beginning at the assertion of the data valid signal for the command, that is shorter than a first time period, wherein the first time period is the sum of the time period required to assert the move signal and the time period to acknowledge that the data has been moved.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4A-4B is a timing diagram of signals received and sent by a memory controller operating in the normal mode and slow mode respectively.

FIGS. 5A-5B are timing diagrams of signals received and sent by a memory controller operating in an optimized slow mode according to an embodiment of the invention.

DETAILED DESCRIPTION OF THE PREFERRED EMBODIMENTS

Embodiments of the present invention optimize data bandwidth across an asynchronous buffer in a system with a variable clock domain. A move signal may be asserted to transfer data associated with a command into the asynchronous buffer. After the data has been moved into the buffer, an acknowledge signal may indicate that the transfer is complete. A launch signal may transfer the data in the asynchronous buffer to memory. Embodiments of the present invention allow the processing of a next command to begin at the earliest possible time while data associated with a previous command is being transferred into and out of the buffer, thereby increasing throughput and improving performance.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

Figure 1:
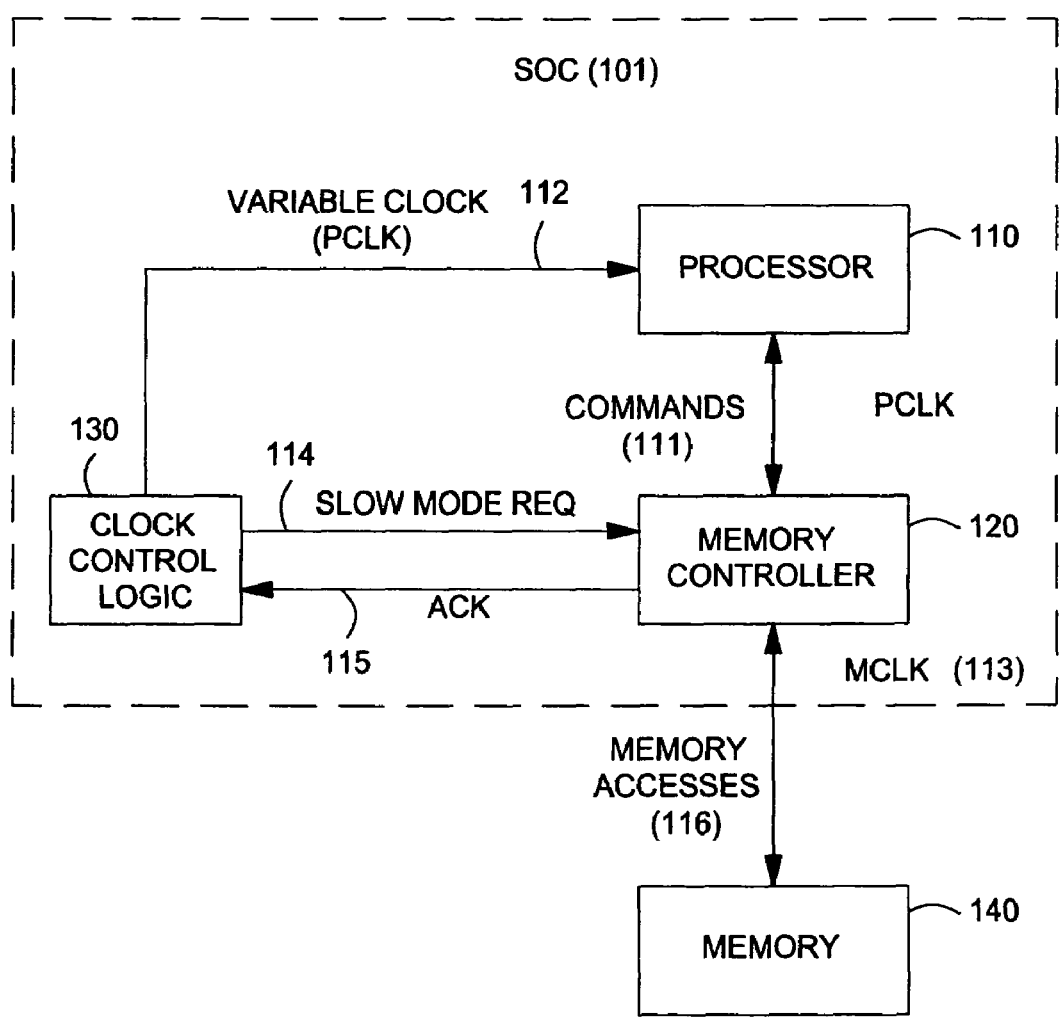
FIG. 1 is an illustration of an exemplary system according to an embodiment of the invention.

FIG. 1 illustrates an exemplary system 100 in which embodiments of the invention may be implemented. System 100 may include an SOC 101 comprising processor 110, Memory controller 120, and clock control logic 130. The system may also comprise memory 140. Memory 140 is preferably a random access memory such as Dynamic Random Access Memory (DRAM) sufficiently large to contain data processed by processor 110.

Processor 110 may be configured to issue commands 111 to memory controller 120 to access memory 140. Commands 111 may include read commands and write commands. For example, commands 111 may include read or write data along with a memory address for a location in memory 140.

Processor 110 may also be configured to operate at variable frequencies to conserve power and maximize performance. For example, processor 110 may initially operate in a clock domain (pclk) at a first frequency. In response to determining that the system is overheating due to high power and energy dissipation at the first frequency, which may damage the system, the processor frequency may be reduced to a second frequency to reduce the power dissipation. The second frequency may be selected to maintain minimum performance requirements while reducing power dissipation. One skilled in the art will recognize, however, that several other reasons for varying frequency such as the different performance requirements for processes may also factor into the decision to vary processor frequency.

Clock control logic 130 may provide a variable clock signal pclk 112 to processor 110. The frequency of operation of the processor may depend on pclk 112. The frequency of pclk may be selected according to power and performance requirements. However, before varying the pclk frequency, clock control logic 130 may be configured to issue a request, for example slow mode request 114 to memory controller 120. After receiving an acknowledge signal 115 from memory controller 120, clock control logic 130 may vary the processor frequency by varying pclk 112.

In response to receiving the slow mode request, memory controller 120 may perform operations necessary to prevent read buffer overflow and write buffer under writes. The operations performed by the memory controller are described in greater detail below.

Memory controller 120 may also perform memory accesses 116 to memory 140. Memory accesses 116, for example, may be performed in response to receiving commands 111 from processor 110. Memory accesses 116 may include read accesses and write accesses to a given location in memory 140. Memory accesses 116 may be performed at a constant memory clock frequency determined by mclk 113.

The Memory Controller

Figure 2:
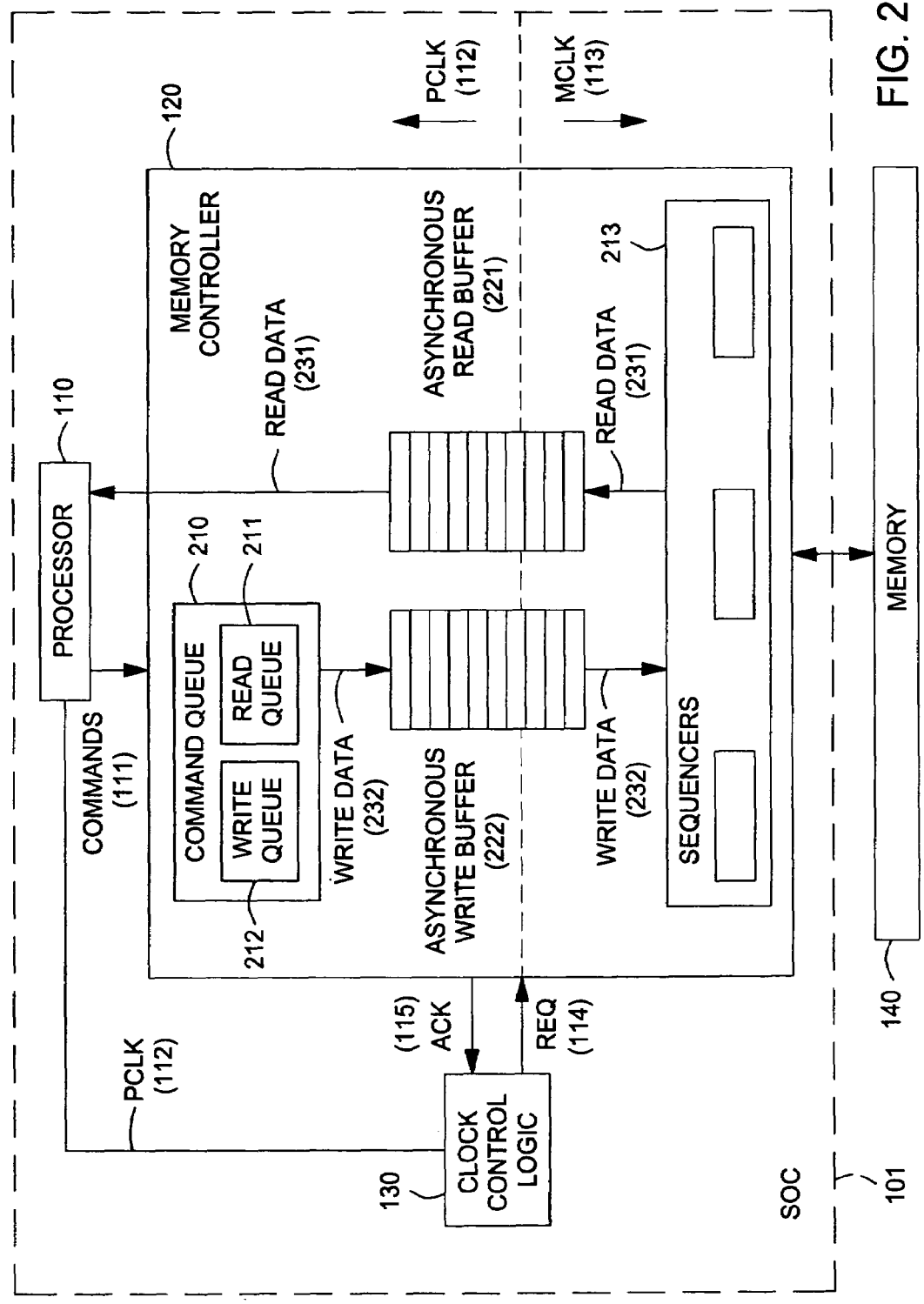
FIG. 2 is an illustration of an exemplary memory controller according to an embodiment of the invention.

FIG. 2 is a detailed illustration of memory controller 120 according to an embodiment of the invention. Memory controller 120 may include a command queue 210, asynchronous read buffer 221, asynchronous write buffer 222, and sequencers 213. Command queue 210 may be configured to receive and store a predetermined number of commands 111 from processor 110. Command queue 210 may be configured to operate in the processor clock (pclk) domain. Therefore, command queue 210 may receive commands at a frequency determined by pclk 112.

Command queue 210 may include a read queue 211 and write queue 212. Read queue 211 may be configured to receive read commands that may be dispatched to sequencers 213 to perform read accesses on memory 140. Write queue 211 may be configured to receive write commands to perform write accesses on memory 140. The data to be written to memory (write data 232), for example, may be transferred to asynchronous write buffer 222 from write queue 212 before performing the write access. Transfer of commands/data from read queue 211 and write queue 212 may be performed in the variable pclk domain.

Asynchronous read buffer 221 may be configured to receive read data 231 from sequencers 213. The read data may be received at a frequency in the memory clock (mclk) domain. Read data 231 in the read buffer may be dispatched to the processor 110 in the processor clock (pclk) domain. Because pclk may be variable, if the frequency of pclk lowers relative to mclk, read data may be written to read buffer 221 at a rate faster than the rate at which read data is sent to the processor. Therefore, embodiments of the invention may utilize a pacing algorithm to prevent overflow of the read buffer 221. For example, memory controller 130 may issue read commands at a predetermined rate, wherein the rate prevents read buffer overflow.

Asynchronous write buffer 222 may be configured to receive write data 232 from write queue 212. The write commands, for example, may include write data along with the address of the location for the write. Write buffer 222 may dispatch write data to sequencers 213 to perform write operations to memory 140.

Write data 232 may be received in write buffer 222 at a frequency determined by variable pclk 112. On the other hand, write commands may be dispatched to the sequencers 213 at a frequency determined by constant mclk 113. If the frequency of pclk is slowed to a rate lower than mclk, sequencers 213 may retrieve write commands from write buffer 222 at a rate greater than the rate at which write commands are transferred to the write buffer from write queue 212. In an effort to avoid write under runs caused by write data being dispatched to sequencers 213 before the write data is completely transferred to the buffer, embodiments of the invention may perform hand shaking across asynchronous write buffer 222. The handshaking algorithm is described in greater detail below.

Sequencers 213 of memory controller 120 may be configured to service commands in command queue 210 by performing memory accesses on memory 140. Memory accesses by sequencers 213 may be performed in the static memory clock (mclk) domain. Servicing a read command, for example, may involve issuing a read signal, waiting a number of clock cycles for a column address strobe (CAS) latency, retrieving data, and waiting for the row to pre-charge. Retrieved read data may be placed in asynchronous read buffer 221.

Servicing a write command may involve issuing a write signal, waiting a number of clock cycles for a CAS latency, bursting data on to a data bus, and waiting for a number of clock cycles for write data recovery and row pre-charge. Bursting data on the bus for example may include retrieving the write data from asynchronous write buffer 222. The sequencer may be further configured to perform memory refresh services involving issuing a refresh signal and waiting a number of clock cycles to refresh memory.

Data Transfers Across the Asynchronous Buffer

Figure 3:
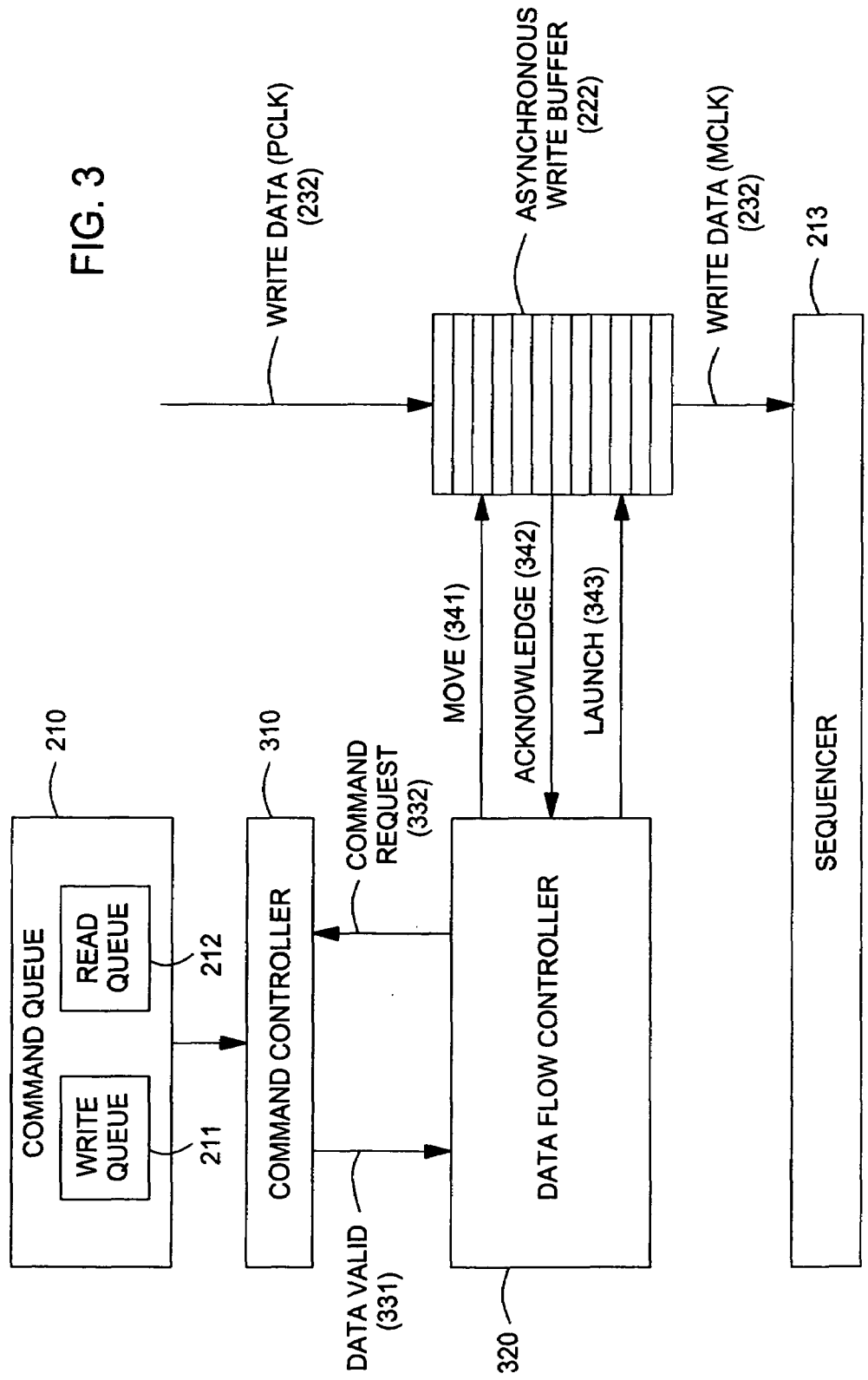
FIG. 3 is an illustration of logic blocks in an exemplary memory controller according to an embodiment of the invention.

FIG. 3 illustrates logic blocks in an exemplary memory controller 120 that may control the transfer of data across an asynchronous buffer such as asynchronous write buffer 222. The logic blocks in memory controller 120 may include a command controller 310 and a data flow controller 320. Command controller 310 and data flow controller 320 may be configured to regulate the processing of commands received by the memory controller to prevent read buffer overflow and write buffer under runs.

Command controller 310 may be configured to select one or more commands received from the processor to initiate processing of the command. For example, command controller 310 may access command queue 210 and select a command from read queue 211 or write queue 212 for processing.

Data flow controller 320 may be configured to regulate the flow of data through an asynchronous buffer, for example asynchronous write buffer 222, as illustrated in FIG. 3. In an effort to prevent write buffer under runs data flow controller 320 may also be configured to perform handshaking with command controller 310. For example, data flow controller 320 may assert a command request signal 332 to command controller 310 to request a new command.

In response to receiving a command request signal 332, command controller 310 may access command queue 210 and select a command from read queue 211 or write queue 212. Command controller 310 may assert a data valid signal 331 to indicate to data flow controller 320 that a command has been selected and data associated with the command is ready to be transferred into the asynchronous write buffer 222.

Data flow controller 320 may assert a move signal 341 to transfer (move) the data associated with the command (for example write data 232 as illustrated in FIG. 3) into asynchronous write buffer 222. The move command may, for example, contain information identifying the data to be moved. Data flow controller 320 may also assert a launch signal 343 to begin transfer (launch) of moved data from asynchronous write buffer 222 to a sequencer 213. Furthermore, when operating in the slow mode, data flow controller 320 may receive an acknowledge signal 342 indicating that the data has been moved into asynchronous write buffer 222. Data flow controller 320 may not assert the launch signal 343 until an acknowledge signal 342 is received, when operating in the slow mode.

FIGS. 4A and 4B are exemplary timing diagrams that illustrate the assertion of the previously described signals (illustrated in FIG. 3) in the normal mode and slow mode respectively. Referring to FIG. 4A, data flow controller 320 may receive a data valid signal from command controller 310 at time t1, as illustrated. The data valid signal may indicate that data associated with a command selected by the command controller is available for transfer into the asynchronous buffer.

Data flow controller 320 may assert a command request signal at time t2 in response to receiving the data valid signal, thereby initiating selection of a next command by the command controller. After the next command is selected, the command controller may assert the data valid signal again (for example at time t4 in FIG. 4A) to indicate that data associated with the next command is ready to be transferred to the asynchronous buffer. The selection of a next command may, for example, take some amount of arbitration time. The arbitration time, for example, may be the time between a command request and the assertion of the data valid signal. In FIG. 4A the arbitration time is illustrated between t2 and t4.

Upon receiving a data valid signal, data flow controller 320 may begin sequencing the moving and launching of available data. In the normal mode, pclk may have a higher frequency than mclk, and therefore the rate at which data is moved into the buffer may be faster than the rate at which data is moved out of the buffer. For example, in FIG. 4A, the moving of data may start at time t3. The launch signal may be asserted at time t5. Because the rate of data movement into the buffer is faster than or equal to the rate of data launching out of the buffer, write under runs may not be encountered. Therefore, the timing of the move and launch of data may be performed simultaneously at time t2, as illustrated in FIG. 4A. While the move time may depend on the variable pclk, launch time may be fixed based on mclk and strict memory access parameters. In other words, the time from the beginning of the launch arrow (t2) to the end (t5) is fixed in a given memory configuration. The next launch arrow may start before the previous launch arrow has finished as long as all of the data has been launched before the subsequent arrow ends.

As described earlier, in the slow mode, moving data into an asynchronous buffer may take a longer period of time than launching data. Therefore, data may not be launched until data has been moved into the buffer. FIG. 4B illustrates the signals asserted and received by data flow controller 320 while operating in the slow mode. As illustrated, data flow controller 320 may begin counting, at time t7, the same time it would have in FIG. 4A, asserting the move signal at time t8 to signal the transfer data to the asynchronous write buffer 222 in response to receiving a data valid signal at time t6.

After the data has been moved into the asynchronous write buffer 222, data flow controller 320 may receive an acknowledge signal between time t9 indicating that the data has been completely moved into the asynchronous buffer. In response to receiving the acknowledge signal, the data flow logic, at time t9, may assert the command request signal to the command controller to request a new command and begin staging the launch signal to transfer the moved data from the asynchronous buffer to memory to begin at time t10.

Optimizing Data Transfers Across the Asynchronous Buffer

As illustrated in FIG. 4B, in the slow mode, a command request for a next command may not be asserted by data flow controller 320 until the data for a previous command is moved into the asynchronous write buffer, and the move has been acknowledged. Waiting for the move to be started (length of the arrow), completed and acknowledged may introduce significant latencies that may degrade performance. Therefore, embodiments of the invention provide mechanisms for issuing a command request at an earlier time, thereby increasing throughput and improving performance of the system.

FIG. 5A illustrates an exemplary timing diagram of signals asserted and received by a data flow controller according to an embodiment of the invention. As illustrated, the data flow controller may receive a data valid signal at time t11. In contrast to FIG. 4B where the command request is not asserted until data is moved and the move acknowledged, the data flow controller 320 in FIG. 5A, at time t12, may assert a command request to command controller 310 in response to receiving the data valid signal.

At time t12, the data flow controller may begin staging the move signal to move data into asynchronous write buffer 222. As illustrated, the data flow controller may begin the sequence to launch the data at time t13 before the completion of the move. The time between the start of the request and the signaling of the move (t12-t13) may depend on a predetermined number of clock cycles, the value of which may be contained in a pacing register. Because the total move time (t13-t14) may be longer than the total launch time (t18A-t18) in the slow mode, the predetermined number of clock cycles may be selected to ensure that the moved data is available before of by the end of the launch. Therefore, write buffer under runs may be avoided.

Furthermore, in FIG. 5A the next command request may be asserted as soon as the next data valid signal is asserted. For example, in FIG. 5A, the next data valid signal is received by the data flow controller at time t16. A command request may be asserted in response to receiving the data valid signal at time t17, as illustrated. The command request may be asserted before the completion of the launch of data of the previous command because the launch of a second command may be overlapped with a previous launch as the buffer may have two or more entries.

FIG. 5B illustrates an exemplary timing diagram of signals asserted and received by data flow controller 320 according to another embodiment of the invention. As in FIG. 5A, the data flow controller may assert the command request signal in response to receiving the data valid signal. For example, in FIG. 5B, the data flow controller receives a data valid signal at time t19. In response to receiving the data valid signal, at time t20, the data flow controller asserts the command request signal to the command controller.

However, in contrast to FIG. 5B, the next command request signal is not asserted until an acknowledge signal is received, indicating that the data has been moved into the asynchronous write buffer. For example, the move signal is asserted at time t21. The move may be performed at the earliest possible time to reduce the latency introduced by the move. Because the time t20 to t21 has been reduced to as small as possible, the data transfer will have a reduced move latency. Therefore, by reducing the move time, the next command request may be asserted at time earlier than in the slow mode of FIG. 4B.

CONCLUSION

By asserting a command request at the earliest possible time, embodiments of the invention may reduce the latency involved in transferring data across an asynchronous buffer after a change in processor frequency. Therefore, the rate at which commands are processed may be increased, thereby improving performance.

While the foregoing is directed to embodiments of the present invention, other and further embodiments of the invention may be devised without departing from the basic scope thereof, and the scope thereof is determined by the claims that follow.

What is claimed is:

1. A memory controller, comprising:
   (i) an asynchronous buffer configured to receive data at a first clock frequency and send data at a second clock frequency;
   (ii) command control logic configured to select, for processing, a command from one or more lists of commands in response to receiving a request signal, and issue a valid signal indicating the command is available for processing; and
   (iii) a data flow controller configured to request the command from the command control logic by asserting the request signal at a first time, initiate transfer of data associated with the command into the asynchronous buffer in response to receiving the valid signal by asserting a move signal, receive an acknowledge signal indicating that the data associated with the command has been transferred into the asynchronous buffer, assert a launch signal to transfer the data associated with the command out of the asynchronous buffer, and to request data for a next command, assert the request signal at a second time wherein a time period between receiving the valid signal for the command and the second time is shorter than a first time period, wherein the first time period is a sum of a time period required to assert the move signal for the command and a time period to acknowledge that the data associated with the command has been moved.

2. The memory controller of claim 1, wherein the data flow controller is configured to assert the data request signal for the next command in the time period by asserting the launch signal before the data associated with the command is completely moved into the asynchronous buffer.

3. The memory controller of claim 2, wherein the data flow controller is configured to assert the launch signal after a predetermined number of clock cycles after the move signal is asserted.

4. The memory controller of claim 3, wherein the predetermined number of clock cycles allow the data associated with the command to be transferred in to the asynchronous buffer before or by the end of the transfer of the data out of the buffer.

5. The memory controller of claim 1, wherein the asynchronous buffer is a write buffer.

6. The memory controller of claim 1, data flow controller is configured to assert the data request signal in the time period shorter than the first time period by asserting the move signal at the earliest possible time.

7. The memory controller of claim 1, wherein the first clock frequency is lower than the second clock frequency.

8. A method for transferring data across an asynchronous write buffer, comprising:
   for a first command, asserting a move signal, wherein the move signal initiates transfer of data associated with the first command into the asynchronous write buffer at a first clock frequency;
   asserting an acknowledge signal to acknowledge that data associated with the first command has been moved into the asynchronous write buffer;
   asserting a launch signal, wherein the launch signal initiates transfer of the data associated with the first command out of the asynchronous write buffer at a second clock frequency; and
   requesting data for a second command, wherein a time period between receiving a data valid signal for the first command and requesting data for the second command is shorter than a first time period, wherein the first time period is a sum of a time period to assert the move signal and a time to acknowledge that the data associated with the first command has been moved.

9. The method of claim 8, wherein requesting data for a second command in the time period comprises asserting the launch signal before the data associated with the first command is completely moved into the asynchronous buffer.

10. The method of claim 9, comprising asserting the launch signal after a predetermined number of clock cycles after the move signal is asserted.

11. The method of claim 10, wherein the predetermined number of clock cycles allow the data associated with the first command to be transferred in to the asynchronous buffer before or by the end of the transfer of the data out of the buffer.

12. The method of claim 8, wherein the asynchronous buffer is a write buffer.

13. The method of claim 8, requesting data for a second command in the time period comprises asserting the move signal at the earliest possible time.

14. The method of claim 8, wherein the first clock frequency is lower than the second clock frequency.

15. A system, comprising:
   memory driven by a constant memory clock;
   a processor driven by a variable processor clock, configured to issue read and write commands to the memory;
   a clock controller configured to issue a request for changing the frequency of the processor clock, and change the frequency of the processor clock; and
   a memory controller comprising:
      (i) an asynchronous buffer configured to receive data at a first clock frequency and send data at a second clock frequency;
      (ii) command control logic configured to select, for processing, a command from one or more lists of commands in response to receiving a request signal, and issue a valid signal indicating the command is available for processing; and
      (iii) a data flow controller configured to request the command from the command control logic by asserting the request signal at a first time, initiate transfer of data associated with the command into the asynchronous buffer in response to receiving the valid signal by asserting a move signal, receive an acknowledge signal indicating that the data associated with the command has been transferred into the asynchronous buffer, assert a launch signal to transfer the data associated with the command out of the asynchronous buffer, and to request data for a next command, assert the request signal at a second time wherein a time period receiving the valid signal for the command and the second time is shorter than a first time period, wherein the first time period is a sum of a time period required to assert the move signal and a time period to acknowledge that the data associated with the command has been moved.

16. The system of claim 15, wherein the data flow controller is configured to assert the data request signal for the next command in the time period by asserting the launch signal before the data associated with the command is completely moved into the asynchronous buffer.

17. The system of claim 16, wherein the data flow controller is configured to assert the launch signal after a predetermined number of clock cycles after the move signal is asserted.

18. The system of claim 17, wherein the predetermined number of clock cycles allow the data associated with the command to be transferred in to the asynchronous buffer before or by the end of the transfer of the data out of the buffer.

19. The system of claim 15, wherein the asynchronous buffer is a write buffer.

20. The system of claim 15, data flow controller is configured to assert the data request signal in the time period shorter than the first time period by asserting the move signal at the earliest possible time.

* * * * *